April 10, 1928.
O. L. DALLY
1,665,533
AERIAL VESSEL
Filed Oct. 22, 1925
3 Sheets-Sheet 1
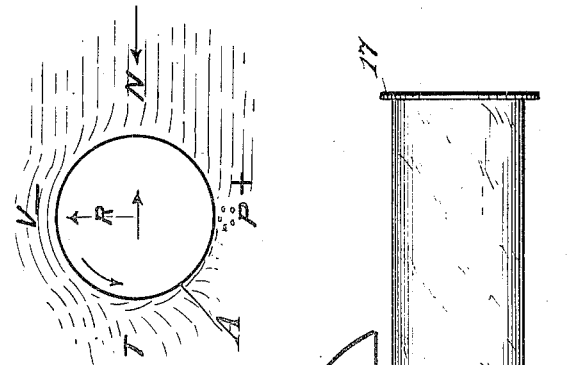
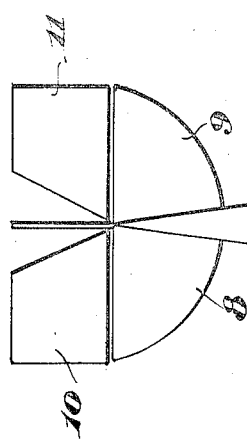
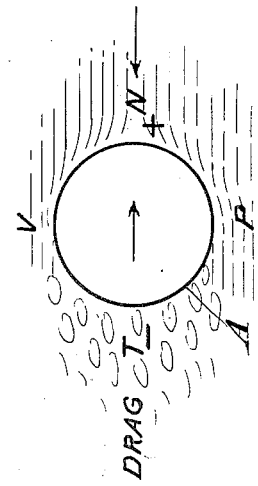
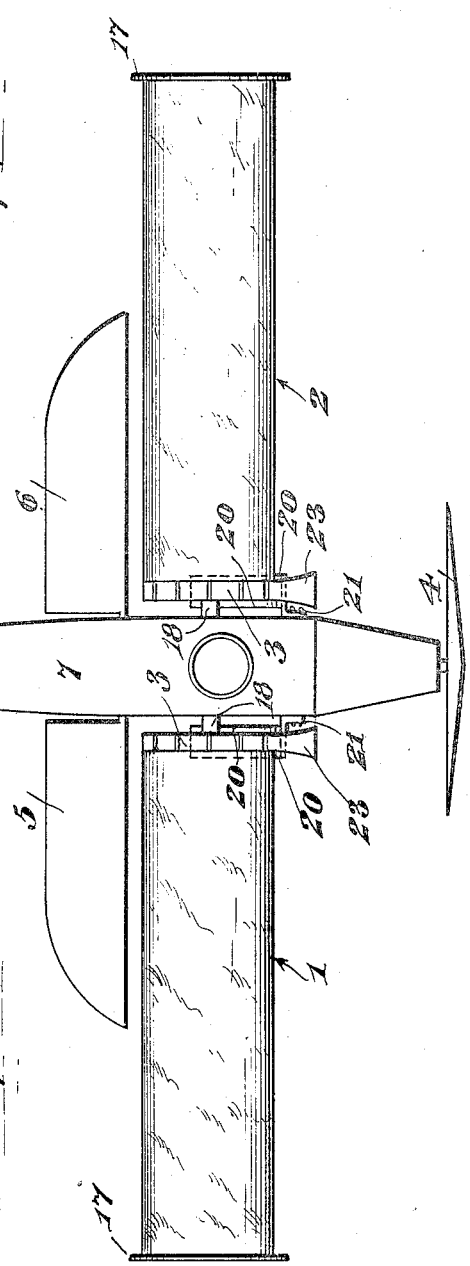
INVENTOR.
Ovid L. Dally,
BY
Geo. P. Kimmel, ATTORNEY.

April 10, 1928.
O. L. DALLY
1,665,533
AERIAL VESSEL
Filed Oct. 22, 1925
3 Sheets-Sheet 2
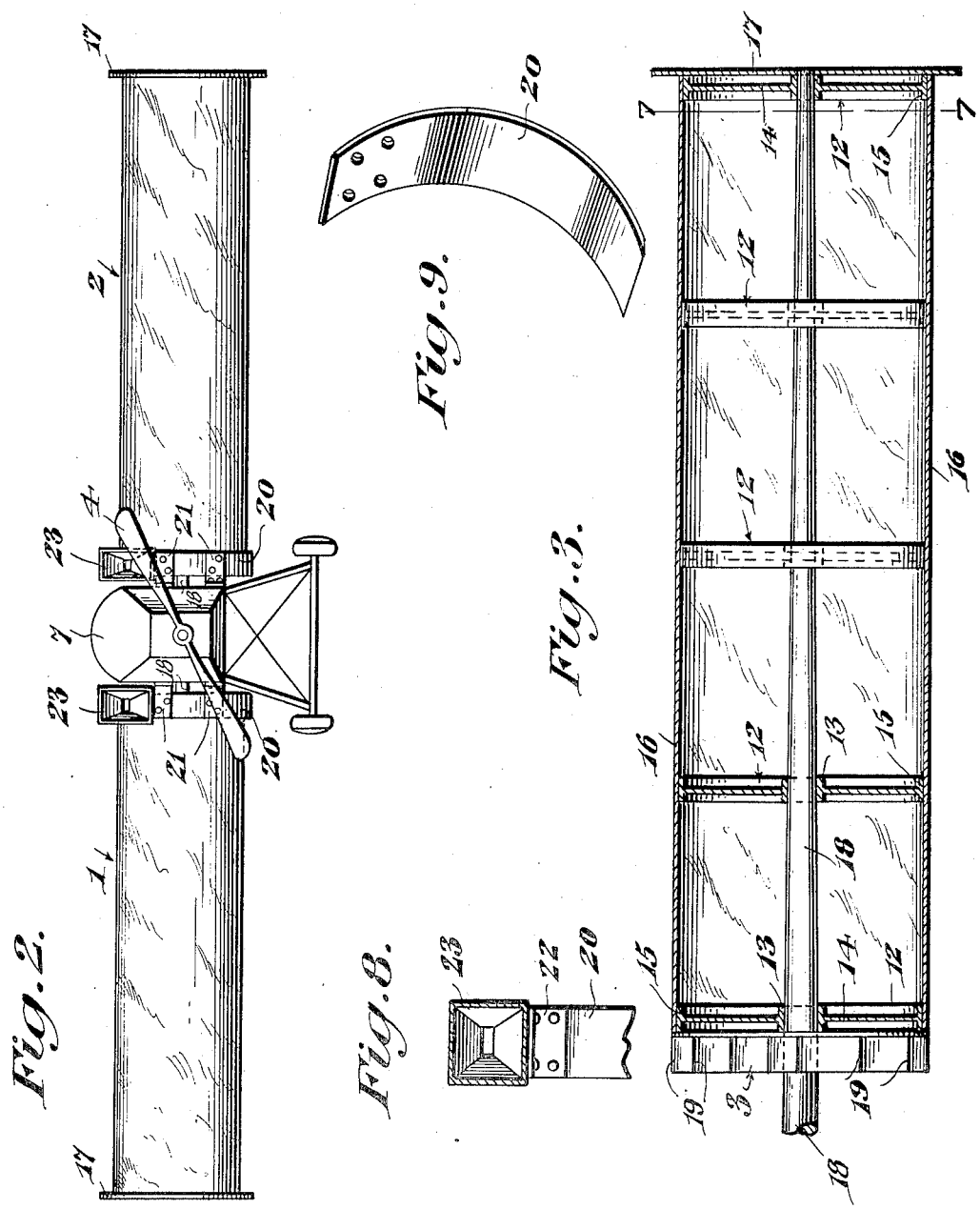
INVENTOR.
Ovid L. Dally,
BY
Geo. F. Kimmel, ATTORNEY.

April 10, 1928.  1,665,533
O. L. DALLY
AERIAL VESSEL
Filed Oct. 22, 1925  3 Sheets-Sheet 3
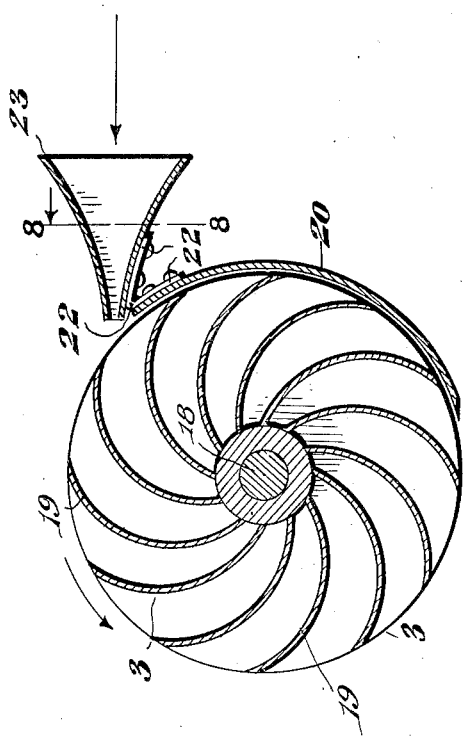
Fig. 5.
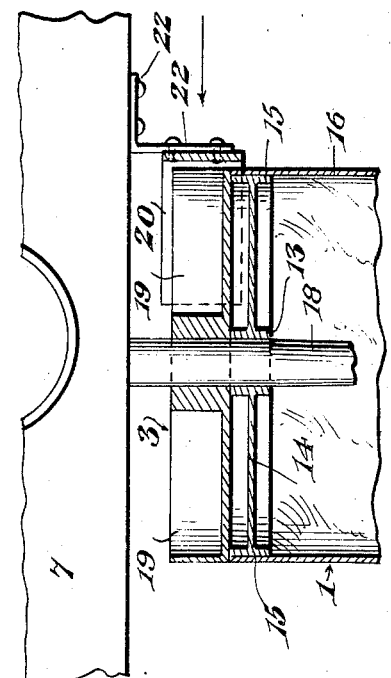
Fig. 1.
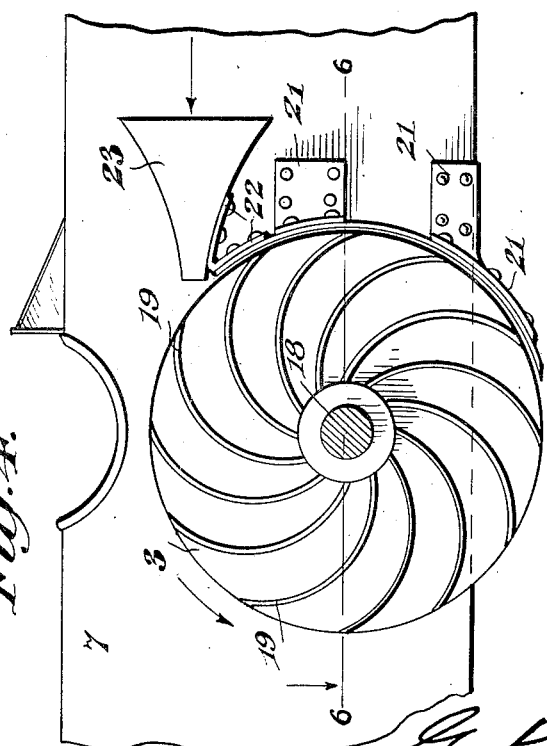
Fig. 4.
Fig. 6.
INVENTOR.
Ovid L. Dally,
BY
Geo. F. Kimmel
ATTORNEY.

Patented Apr. 10, 1928.

1,665,533

UNITED STATES PATENT OFFICE.

OVID L. DALLY, OF CLEVELAND, OHIO.

AERIAL VESSEL.

Application filed October 22, 1925. Serial No. 64,175.

This invention relates to aerial vessels, such as the aeroplane or sea-plane type, and has for its object to provide, in a manner as hereinafter set forth, a vessel of such class, whereby the resultant force from a Magnus effect is utilized vertically at right angles to the direction of the wind and in the direction towards which the surface of the object is moving at the point of contact with the air for materially increasing the lifting power of the vessel over known constructions when travelling at the same rate of speed, and further to overcome any difficulty in taking off and landing.

A further object of the invention is to provide, in a manner as hereinafter set forth, a vessel of the class referred to, having the main supporting surfaces thereof in the form of a pair of oppositely extending air driven rotors to produce a Magnus effect and with the vessel creating its own air speed for the rotors without depending on the speed or direction of the wind and with the rotors disposed whereby the resulting force from the Magnus effect would always be vertical so long as the vessel is flying horizontally and and so that the resultant lift would be determined in part by the speed at which the rotors are revolved, or whereby the resultant force from the Magnus effect will be disposed at right angles to the direction of travel of the vessel.

Further objects of the invention are to provide in a manner as hereinafter set forth, a vessel of the class referred to, which is comparatively simple in its construction and arrangement, strong, durable, readily assembled, thoroughly efficient in its use, and comparatively inexpensive.

With the foregoing and other objects in view, the invention consists of the novel construction, combination and arrangements of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of an aerial vessel of the aeroplane type, in accordance with this invention.

Figure 2 is a front elevation thereof.

Figure 3 is a longitudinal sectional view of one of the wings or sustaining elements and which is in the form of an air driven rotor.

Figure 4 is a fragmentary view looking towards the inner end of a sustaining element.

Figure 5 is a sectional detail looking towards the inner end of a sustaining element.

Figure 6 is a fragmentary view, in sectional plan, illustrating the inner terminal portion of a sustaining element.

Figure 7 is a section on line 7—7, Figure 3.

Figure 8 is a section on line 8—8, Figure 5.

Figure 9 is a perspective view of the shield for a turbine.

Figures 10 and 11 are diagrammatical views illustrating the resulting forces with respect to the revoluble sustaining elements.

Referring to the drawings in detail, 1 and 2 generally indicate the revoluble sustaining elements each in the form of a rotor and one extending in an opposite direction with respect to the other. The rotors are horizontally disposed and each extends at right angles with respect to the body of the plane. Connected to the inner end of each of the sustaining elements is a wind driven turbine referred to generally by the reference character 3. The propeller of the plane is indicated at 4, the ailerons or side stabilizers and controls are indicated at 5, 6, the fuselage at 7, the horizontal stabilizers at 8, 9, and the elevators at 10, 11.

Each revoluble sustaining element consists of a series of circular supports referred to generally by the reference character 12 and consisting of a hub 13, having projecting therefrom a series of radially disposed arms or spokes 14 connected at their outer ends to a rim 15. The body portion 16 of each of the sustaining elements is formed from plane cloth and is secured to and maintained in cylindrical form by the supports 12. Connected to the outer end of each sustaining element is a means for confining the air current thereon, that is to say to prevent the current from spreading off the outer end of the sustaining element. The said means consists of an endless tip 17 projecting a substantial distance in a lateral direction from and with respect to the periphery of the sustaining element. The tip 17 is formed from a circular disk of greater diameter than the diameter of the body portion 16, positioned against, arranged concentrically with respect to and closing the outer end of the sustaining element. Secured to the inner end of each sustaining element is the wind driven turbine 3 therefor, and said turbine as well as the sustaining element is fixed to a tapered shaft 18, which is journaled at its inner end in the fuselage 7. The blades of each of the turbines are indicated at 19 and associated therewith is a depending curved shield 20, which is supported by the brackets 21, secured to and projecting laterally from the fuselage 7. Connected to the upper end of the shield 20 by a supporting bracket 22 is a funnel-shaped air director 23 for directing the air to the blade of the turbine. See Figure 5.

The funnels project forwardly from the turbines 3 and take the air from the propeller 4 and direct it against the blades of the turbine for the purpose of revolving the sustaining elements 1, 2.

The effect obtained by the revolving sustaining elements is the Magnus effect and owing to the horizontal disposition of the sustaining elements the resultant force from the Magnus effect will extend at right angles to the direction of travel of the plane.

To more clearly define the resultant force obtained by the horizontally disposed revoluble sustaining elements, attention is directed to Figures 10 and 11, and with reference thereto A indicates the cylindrical or round revoluble sustaining element. When the element is not revolving there will be a positive pressure at point N and a negative pressure at point T. Pressures at P and V are necessarily equal as shown in Figure 10. When the element is revolving as in Figure 11, there will be a less or negative intensity at point V and a greater or positive intensity created at point P. This is due to the viscosity of the air. At any rate it is the result of the action of air upon any revolving object as was first noticed by Magnus. The resulting force R is always vertical directly at right angles to the direction of the wind and in the direction towards which the surface of the element is moving at the point of contact with the air as the elements are horizontally disposed and not vertically arranged.

The sustaining elements of the plane, in accordance with this invention, do not depend upon a wind for the operation thereof as the plane always creates its own air speed or its own air to provide for the operation of the revolving sustaining elements without in any manner depending upon the speed or direction of a wind. As the sustaining elements are disposed horizontally, the resulting force is always vertical as long as the plane is flying horizontal and the resulting lift is determined in part by the speed at which the sustaining elements are revolved. With the sustaining elements placed horizontally and with the bottom side revolving into the wind, the resulting force will be vertical and many times greater, especially at speeds below twenty-five miles an hour than can be obtained by any present type of wing or sustaining element, under such conditions materially increasing the lifting power of the plane, over known constructions, when travelling at the same rate of speed, and further overcoming any difficulty when taking off or landing.

Although the body portion of each of the sustaining elements has been referred to as constructed of ordinary aeroplane cloth material, said body portion can be set up of light metallic sheeting, such as is now used in metal aeroplanes. The surface of the body portion of the sustaining element may be rough or smooth, there being no practical difference in the result obtained in either.

What I claim is:—

1. An aerial vessel comprising a pair of lengthwise aligned revoluble cylindrical sustaining elements to obtain a Magnus effect with the resulting force extending at right angles to the direction of travel of the vessel, and an air driven turbine fixed to the inner end of each of said elements, bodily revolving therewith and having the operating air therefor directed from the propeller of the vessel on the operation thereof.

2. An aerial vessel comprising a pair of lengthwise aligned revoluble cylindrical sustaining elements to obtain a Magnus effect with the resulting force extending at right angles to the direction of travel of the vessel and each having its entire outer curved periphery simultaneously exposed during the revolving thereof, and an air driven turbine fixed to the inner end of each of said elements, bodily revolving therewith and having the operating air therefor directed from the propeller of the vessel on the operation thereof.

3. An aerial vessel comprising a pair of lengthwise aligned revoluble cylindrical sustaining elements to obtain a Magnus effect with the resulting force extending at right angles to the direction of travel of the vessel and each having its entire outer curved periphery simultaneously exposed during the revolving thereof, means at the outer end of each of said elements to provide a tip therefor corresponding in contour to the shape thereof, and an air driven turbine fixed to the inner end of each of said elements, bodily revolving therewith and having the operating air therefor directed from the propeller of the vessel on the operation thereof.

4. An aerial vessel comprising horizontally disposed, revoluble, cylindrical air driven sustaining elements for utilizing the resulting force from the Magnus effect in a direction at right angles to the travel of the vessel and driven at their inner ends from air directed from the propeller of the vessel during its operation, each of said elements including at its inner end an air driven turbine bodily revoluble therewith.

5. An aerial vessel comprising horizontally disposed, revoluble, cylindrical air driven sustaining elements for utilizing the resulting force from the Magnus effect in a direction at right angles to the travel of the vessel and driven at their inner ends from air directed from the propeller of the vessel during its operation, each of said elements including at its inner end an air driven turbine bodily revoluble therewith, and an air directing means associated with each of said turbines for receiving the air directed from the propeller.

6. In an aerial vessel, a fuselage, a propeller at the forward end thereof, a pair of oppositely extending revoluble, cylindrical sustaining elements, each supported from one side of the fuselage and disposed at right angles with respect thereto and obtaining a Magnus effect with the resulting force extending at right angles to the direction of travel of the vessel and each having its entire outer curved periphery simultaneously exposed during the revolving thereof, and an air driven turbine fixed to the inner end of each of said elements, bodily revolving therewith and having the operating air therefor directed from said propeller on the operation thereof.

7. In an aerial vessel, a fuselage, a propeller at the forward end thereof, a pair of oppositely extending revoluble, cylindrical sustaining elements, each supported from one side of the fuselage and disposed at right angles with respect thereto and obtaining a Magnus effect with the resulting force extending at right angles to the direction of travel of the vessel and each having its entire outer curved periphery simultaneously exposed during the revolving thereof, an air driven turbine fixed to the inner end of each of said elements, bodily revolving therewith and having the operating air therefor directed from said propeller on the operation thereof, and an air directing means associated with each of said turbines and receiving the air directed from the propeller.

In testimony whereof, I affix my signature hereto.

OVID L. DALLY.